(12) United States Patent
Bauerle

(10) Patent No.: US 8,630,759 B2
(45) Date of Patent: Jan. 14, 2014

(54) CONTROL OF REGENERATIVE BRAKING IN A HYBRID VEHICLE

(75) Inventor: Paul A. Bauerle, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 736 days.

(21) Appl. No.: 12/622,469

(22) Filed: Nov. 20, 2009

(65) Prior Publication Data

US 2011/0125351 A1    May 26, 2011

(51) Int. Cl.
*B60L 7/10* (2006.01)
*B60W 20/00* (2006.01)
*B60W 10/18* (2012.01)
*B60W 10/28* (2006.01)
*B60W 10/26* (2006.01)

(52) U.S. Cl.
CPC . *B60L 7/10* (2013.01); *B60W 20/00* (2013.01); *B60W 10/18* (2013.01); *B60W 10/26* (2013.01); Y10S 903/947 (2013.01); Y10S 903/907 (2013.01)
USPC .............................. 701/22; 903/947; 903/907

(58) Field of Classification Search
USPC .......................................................... 701/22
See application file for complete search history.

(56) References Cited

U.S. PATENT DOCUMENTS

| 5,291,960 | A | * | 3/1994 | Brandenburg et al. | 180/65.27 |
| 6,378,636 | B1 | * | 4/2002 | Worrel | 180/65.25 |
| 6,646,845 | B1 | * | 11/2003 | Turner et al. | 361/86 |
| 7,096,985 | B2 | * | 8/2006 | Charaudeau et al. | 180/65.245 |
| 7,679,337 | B2 | * | 3/2010 | Yoshida et al. | 320/167 |
| 2006/0046895 | A1 | * | 3/2006 | Thacher et al. | 477/4 |
| 2008/0053716 | A1 | * | 3/2008 | Scheucher | 180/2.1 |
| 2009/0143950 | A1 | * | 6/2009 | Hasegawa et al. | 701/68 |
| 2009/0200991 | A1 | * | 8/2009 | Yoshida et al. | 320/166 |

FOREIGN PATENT DOCUMENTS

WO    2008147305 A1    12/2008
WO    WO 2008147305 A1 *  12/2008  ............... B60H 1/03

* cited by examiner

*Primary Examiner* — Shelley Chen
(74) *Attorney, Agent, or Firm* — Quinn Law Group, PLLC

(57) ABSTRACT

A method is provided for controlling regenerative braking in a hybrid electric vehicle. The vehicle includes an energy-storage device, a motor/generator configured to retard the vehicle via regenerative braking, and a controller arranged to control regenerative braking. The method includes receiving a regenerative braking request, and detecting whether the energy-storage device is between first and second predetermined states of charge. The method additionally includes retarding the vehicle via the motor/generator and directing electrical energy from regenerative braking to an energy dissipating device, if the energy-storage device is at or above the first predetermined state of charge, or at or below the second predetermined state of charge. Furthermore, the method includes retarding the vehicle via the motor/generator and directing electrical energy from regenerative braking to the energy-storage device, if the energy-storage device is between the first and second predetermined states of charge.

20 Claims, 2 Drawing Sheets

CONTROL OF REGENERATIVE BRAKING IN A HYBRID VEHICLE

TECHNICAL FIELD

The invention relates to hybrid vehicles, and, more particularly, control of regenerative braking in such a vehicle.

BACKGROUND OF THE INVENTION

In addition to a typical friction braking system that dissipates a vehicle's kinetic energy as heat, hybrid vehicles are typically provided with regenerative braking capability. Regenerative braking is a mechanism that reduces a vehicle's speed by converting some of its kinetic energy into a storable form of energy.

Typically, in hybrid vehicles, regenerative braking employs an electric motor for generating electrical current to charge an on-board storage device, such as one or more batteries. Thus, any energy that is captured during a regenerative braking event and stored within a storage device may be reused at a later time to operate the vehicle and improve the subject vehicle's operating efficiency. On the other hand, any energy that is dissipated by the friction braking is typically lost to the ambient.

SUMMARY OF THE INVENTION

A method is provided for controlling regenerative braking in a hybrid electric vehicle. The hybrid vehicle includes an energy-storage device configured to selectively store energy up to a first predetermined state of charge and release the stored energy down to a second predetermined state of charge as needed. The vehicle also includes a motor/generator configured to receive energy from and supply energy to the energy-storage device, and to retard the vehicle via the regenerative braking, as well as a controller arranged to control the regenerative braking event.

The method includes providing an energy dissipating device configured to dissipate energy from the regenerative braking event, receiving a regenerative braking request, and detecting whether the energy-storage device is between the first and second predetermined states of charge. The method additionally includes retarding the vehicle via the motor/generator and directing electrical energy from regenerative braking to the energy dissipating device, if the energy-storage device is at or above the first predetermined state of charge, or at or below the second predetermined state of charge. Furthermore, the method includes retarding the vehicle via the motor/generator and directing electrical energy from regenerative braking to the energy-storage device, if the energy-storage device is between the first and second predetermined states of charge.

According to one embodiment of the method, the energy dissipating device may be at least one of a block heater for the engine, a heating element for the energy-storage device, and a heating and ventilation (HVAC) system. The subject vehicle may also include a friction braking system configured to retard the vehicle. In such a case, retarding of the vehicle via the motor/generator is accomplished in combination with the friction braking system to vary a degree of vehicle retardation. The foregoing retarding of the vehicle via the motor/generator in combination with the friction braking system is regulated by the controller according to a predetermined schedule.

The hybrid vehicle may additionally include an internal combustion engine configured to propel the vehicle. Such an engine may be shut-off during the regenerative braking, and the energy dissipating device may be a catalyst pre-heater for the engine's exhaust system. Furthermore, the hybrid vehicle may include a fuel-cell configured to propel the vehicle. In such a case, the energy dissipating device may also be a heater for the fuel-cell. According to another embodiment, the hybrid vehicle may be a plug-in (PHEV) electric type having an electrical plug, such that the energy-storage device may be recharged by connecting the plug to an external electrical power source.

Additionally, a system is disclosed for controlling regenerative braking in a hybrid electric vehicle, where a controller is adapted for executing the aforementioned method.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
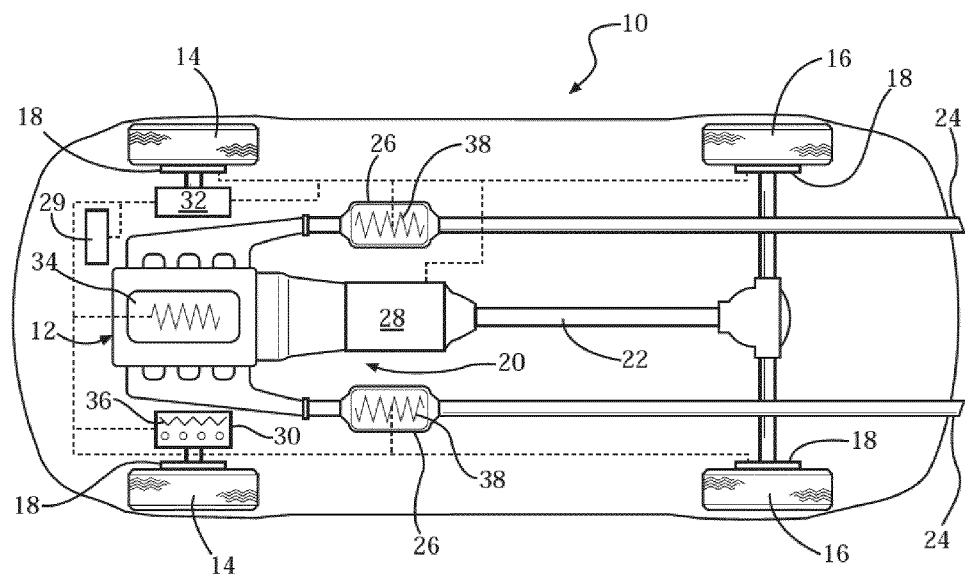
FIG. 1 is a schematic plan view of a hybrid electric vehicle.

Referring to the drawings, wherein like reference numbers refer to like components, FIG. 1 shows a schematic view of a hybrid electric vehicle (HEV) 10. Typically, an HEV does not employ any external power sources for charging its energy-storage device. By comparison, a plug-in hybrid electric vehicle (PHEV) is a hybrid vehicle with an energy-storage device or batteries that can be recharged by connecting a plug to an external electrical power source, as understood by those skilled in the art.

The HEV 10 includes an internal combustion engine 12, such as a spark or a compression ignition type engine, adapted for driving wheels 14 and/or wheels 16 to propel the vehicle. Engine 12 may also be employed for engine braking, i.e., using the inertia of the HEV 10 to rotate the engine, thereby slowing the vehicle when the HEV is coasting down from elevated speed. The hybrid vehicle 10 may also be slowed or retarded by a friction braking system that includes members 18. Members 18 typically include components such as brake rotors, brake calipers and brake pads that are commonly hydraulically actuated, as known to those skilled in the art, and are not explicitly shown. Members 18 are adapted to apply a frictional force to the wheels 14 and 16 for reducing speed of the HEV by dissipating the vehicle's kinetic energy as heat.

The engine 12 applies its torque to the driven wheels 14 and/or 16 through a transmission 20 and via a drive or a propeller shaft 22. The engine 12 emits gases that are a product of the combustion process via an exhaust system 24 to the ambient. The exhaust system 24 includes catalytic converters 26 that are employed to reduce toxicity of the emitted exhaust gases prior to the gases entering the atmosphere, as understood by those skilled in the art. Engine 12, wheels 14 and 16, transmission 20, propeller shaft 22 are all part of a driveline of the HEV 10.

In addition to engine 12, wheels 14 and 16, transmission 20, and propeller shaft 22, the driveline of HEV 10 includes a motor/generator 28. The HEV 10 is capable of being propelled by the motor/generator 28 alone or in combination with the engine 12. As shown, the motor/generator 28 is positioned within the transmission 20, but may also be positioned anywhere in the HEV 10, depending on the vehicle architecture and control of the power flow, as known by those skilled in the art. As additionally understood by those skilled in the art, although a single motor/generator is shown, depending on the actual configuration of the HEV 10, there may be multiple motor/generators within the driveline of a subject vehicle. The HEV 10 additionally includes a passenger compartment heating and ventilation system (HVAC) 29.

Motor/generator 28 is configured to receive energy from and supply energy to an energy-storage device 30, such as one or more batteries, and to retard the vehicle via the regenerative braking, as understood by those skilled in the art. Energy-storage device 30 supplies electrical energy to power the engine 12, the motor/generator 28, the HVAC system 29, and other miscellaneous vehicle accessories, such as vehicle exterior and interior lighting. Energy-storage device 30 is configured to selectively store energy up to a first predetermined state of charge (SOC), and release the stored energy down to a second predetermined SOC. The HEV 10 also includes a controller 32 adapted to regulate the operation of engine 12, motor/generator 28, transmission 20, members 18 of the friction braking system and energy-storage device 30 between its first predetermined SOC, and its second predetermined SOC.

The first predetermined SOC is a substantially maximum SOC above which the energy storage device 30 may not, either efficiently, or without possible damage, accept additional charge. The second predetermined SOC is a low SOC below which the energy storage device 30 is similarly incapable of accepting additional charge. The second predetermined SOC may be influenced by a variety of factors, such as, the ambient temperature being too low, or a fault within the energy-storage device 30, as understood by those skilled in the art. A fault may be generated within the energy-storage device 30, if, for example, the internal temperature of the energy-storage device increases above a specific operating limit, such as due to a recently interrupted quick charging cycle.

Regenerative braking is a mechanism typically included in hybrid vehicles to reduce vehicle speed by converting some of the vehicle's kinetic energy into a storable form of energy instead of dissipating it as heat, as understood by those skilled in the art. Regenerative braking is frequently employed when the engine 12 is shut-off. The storable energy from regenerative braking is typically channeled to energy-storage device 30 to restore its depleted SOC. Because regenerative braking recaptures otherwise lost energy, it may provide a more efficient mode of vehicle retardation than braking via members 18 of the friction braking system.

When solely the motor/generator 28 is employed to propel the HEV 10, i.e., the engine 12 is shut-off, the engine may cool off sufficiently such that upon the engine's subsequent re-start its exhaust gas emissions are increased relative to the engine's fully warm state. In order to keep the engine 12 ready for a quick restart, HEV 10 includes a block heater 34 that acts as an electrical energy dissipating device to provide heat to the engine while the engine is inactive. Thus, block heater 34 may be used to ease starting of engine 12 in cold weather and to reduce start-up exhaust emissions by keeping the engine warm while it is turned-off. Controller 32 regulates the block heater 34 to draw electrical energy either from the energy-storage device 30 or from the motor/generator 28.

HEV 10 may be operated in a situation where the SOC of energy-storage device 30 is substantially at the first predetermined SOC. If regenerative braking is called upon when the energy-storage device 30 is substantially at its maximum operating level, such as when HEV 10 is coasting downhill, the controller 32 may redirect the electrical energy recaptured by the motor/generator 28 to one or more energy dissipating devices, such as the block heater 34. Redirecting the recaptured energy to the block heater 34, permits the block heater to keep engine 12 warm for a subsequent restart. HEV 10 may also be operated in a situation where the SOC of energy-storage device 30 is at or below the second predetermined SOC, where the battery is incapable of accepting additional charge due to the factors such as the ones outlined above. If regenerative braking is called upon in such a situation, the controller 32 may also redirect the electrical energy recaptured by the motor/generator 28 to one or more energy dissipating devices.

As shown in FIG. 1, HEV 10 also includes a heating element 36, which operates as an energy dissipating device, to keep the energy-storage device 30 at its proper operating temperature. If regenerative braking is called upon when the SOC is substantially at its maximum level, the controller 32 may redirect the electrical energy recaptured by the motor/generator 28 to the heating element 36. Also shown are catalyst pre-heaters 38, which function as energy dissipating devices, same as block heater 34 and heating element 36. HEV 10 includes catalyst pre-heaters 38 configured to keep catalysts 26 at their proper operating temperature while the engine 12 is shut-off, in order to reduce exhaust emissions from the engine upon a subsequent re-start. If regenerative braking is called upon when the SOC is substantially at the first predetermined SOC, the controller 32 may also redirect the electrical energy recaptured by the motor/generator 28 to the catalyst pre-heaters 38.

Figure 1A:
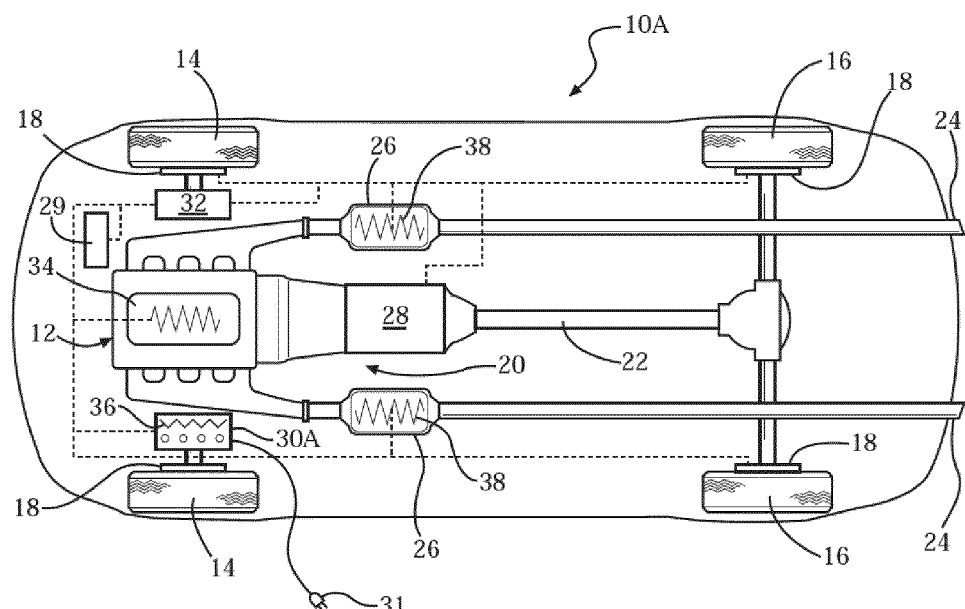
FIG. 1A is a schematic plan view of a plug-in hybrid electric vehicle.

FIG. 1A shows a plug-in hybrid electric vehicle (PHEV) 10A. PHEV 10A is configured identically to HEV 10 shown in FIG. 1, except for additionally including an electrical plug 31 in electrical communication with an energy-storage device 30A. Plug 31 is employed to connect the energy-storage device 30A to an external electrical power source (not shown) for recharging PHEV 10A. Because the energy-storage device 30A is configured to be charged from an external source, the PHEV 10A may experience a situation where the regenerative braking is called upon and the SOC is substantially at the first predetermined SOC more frequently than may a non-plug-in HEV 10. Such a situation may, for example, occur when PHEV 10A is called upon to coast downhill shortly following a complete recharge of the energy-storage device 30A.

Figure 1B:
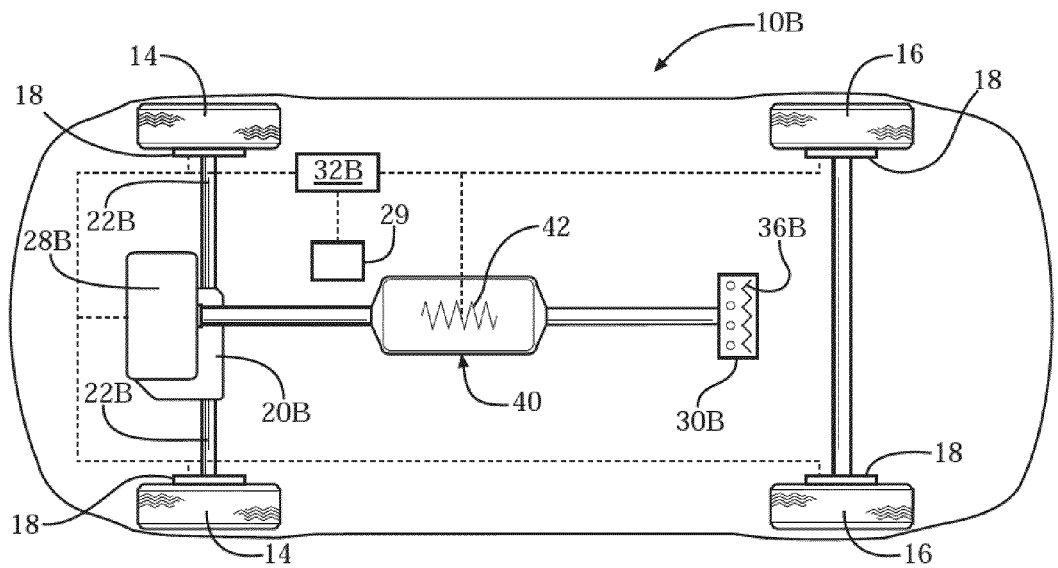
FIG. 1B is a schematic plan view of a fuel-cell hybrid electric vehicle.

FIG. 1B shows a fuel-cell hybrid electric vehicle (FCHEV) 10B. FCHEV 10B includes wheels 14 and 16, friction braking system with members 18, and HVAC system 29, identically to HEV 10 and PHEV 10A of FIGS. 1 and 1A, respectively. FCHEV 10B additionally includes a motor/generator 28B, a transmission 20B, propeller shafts 22B, and an energy storage device 30B with a heating element 36B, that function similarly to motor/generator 28, transmission 20, propeller shaft 22, and energy storage device 30 of FIGS. 1 and 1A. Furthermore, FCHEV 10B includes a fuel-cell 40 configured to propel the vehicle, but also capable of being shut-off. Fuel-cell 40 is typically constructed from a stack of cells (not shown), as known by those skilled in the art. FCHEV 10B also includes a heater 42, that operates as an energy dissipating device, in order to warm up fuel-cell 40 prior to the fuel-cell being employed for propelling the vehicle.

FCHEV 10B also includes a controller 32B that is adapted to regulate the operation of members 18 of the friction braking system, transmission 20B, motor/generator 28B, fuel-cell 40, and energy-storage device 30B between its first predetermined SOC, and its second predetermined SOC. Controller 32B additionally regulates heating element 36B or heater 42 to draw electrical energy either from the energy-storage device 30B or from the motor/generator 28B. Depending on the SOC of the energy-storage device 30B, controller 32B may direct energy recaptured by the motor/generator 28B during regenerative braking to the energy storage device, or to HVAC system 29, heating element 36B, heater 42, or any other energy dissipating device included in FCHEV 10B.

In HEV 10 and in PHEV 10A it may be advantageous to preserve as much regenerative braking as possible to improve overall vehicle efficiency, and not restart engine 12 solely for engine braking. It may also be advantageous to not switch from regenerative braking to frictional braking abruptly, in either HEV 10, PHEV 10A, or FCHEV 10B, because of the difference in the rate and degree of retardation between the two modes. As is known by those skilled in the art, the rate of retardation with regenerative braking is typically lower than what could be achieved with frictional braking. To address the above concerns, controller 32 may regulate retardation of HEV 10 or PHEV 10A by combining or blending frictional braking together with regenerative braking according to a predetermined program or schedule to vary the degree of retardation. In such a situation, controller 32 may additionally redirect a portion of the energy that is recaptured by the motor/generator 28 to one or more of the energy dissipating devices, such as block heater 34, heating element 36, catalyst pre-heaters 38, and HVAC system 29.

A similar strategy is applied to the FCHEV 10B, such that controller 32B may regulate retardation of FCHEV by combining or blending frictional braking together with regenerative braking to vary the degree of retardation. Controller 32B may similarly redirect a portion of the energy that is recaptured by the motor/generator 28B to one or more of the energy dissipating devices, such as the heater 42, the heating element 36, and HVAC system 29.

A situation may develop in HEV 10 and PHEV 10A when energy-storage device 30 is below the second predetermined SOC, engine 12 is running, but not propelling the vehicle, and motor/generator 28 is providing regenerative braking. Such a condition is possible when the vehicle is coasting downhill. Consequently, engine 12 is already providing heat energy to catalysts 26, such that operation of heater 42 is not beneficial. Engine 12 is also recharging energy-storage device 30 via an alternator (not shown), despite the energy-storage device operating below the second predetermined SOC. Therefore, any excess energy from the regenerative braking may also be directed to energy-storage device 30. A similar situation may develop in FCHEV 10B of FIG. 1B, where fuel-cell 40 is not propelling the vehicle, but is generating energy and heat, such that operation of heater 42 is not beneficial. In such a case, fuel-cell 40 may provide electrical charge to energy-storage device 30B, despite the energy-storage device operating below the second predetermined SOC. Therefore, any excess energy from the regenerative braking may also be directed to energy-storage device 30B.

Figure 2:
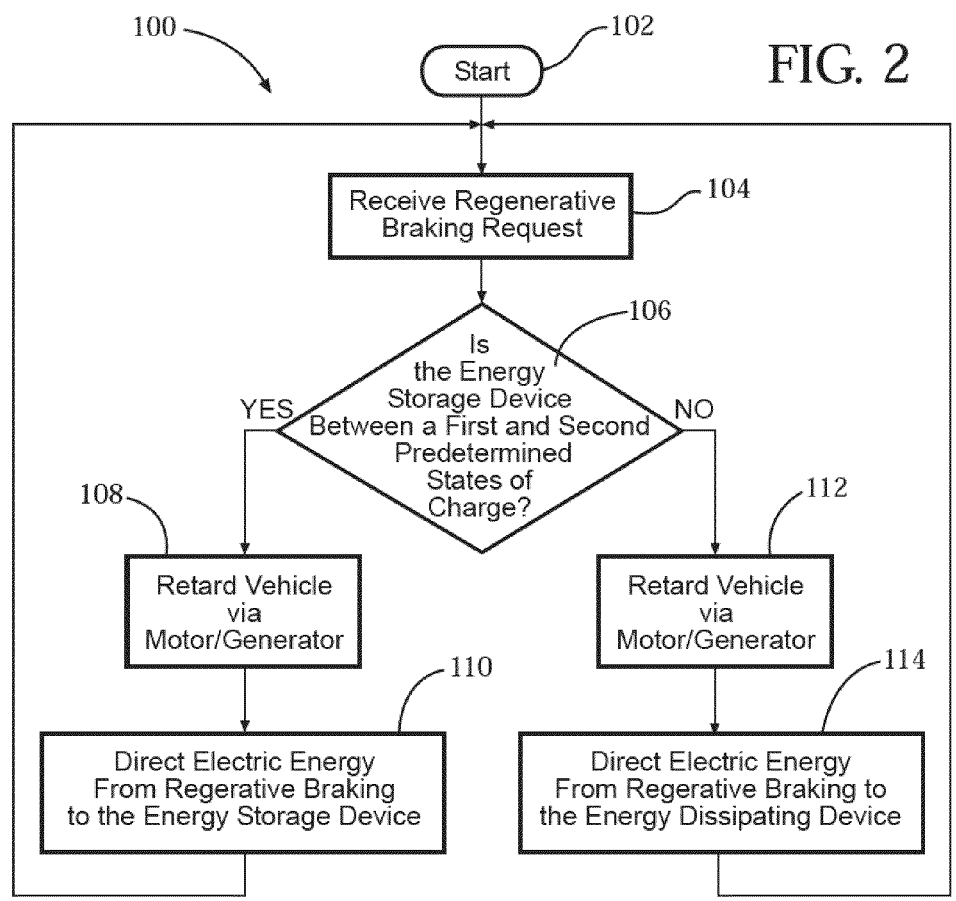
FIG. 2 is a flow chart illustrating a method for controlling regenerative braking in the hybrid electric vehicles depicted in FIGS. 1, 1A and 1B.

FIG. 2 depicts a method 100 for controlling regenerative braking in a hybrid electric vehicle. HEV 10 and PHEV 10A each include one or more energy dissipating devices, such as block heater 34, heating element 36 and catalyst pre-heaters 38, configured to dissipate energy from the regenerative braking. Although method 100 is described herein as employed to increase operating efficiency in HEV 10 of FIG. 1, it may similarly be employed in other types of hybrid electric vehicles, including PHEV 10A and FCHEV 10B, of FIGS. 1A and 1B, respectively.

The method commences in frame 102, and then proceeds to frame 104 where a regenerative braking request is received by the controller 32. Following frame 104, whether the energy-storage device 30 is between the first predetermined state of charge (SOC) and the second predetermined SOC is detected by the controller 32 in frame 106. The SOC may be substantially at the first predetermined level if, for example, the energy-storage device 30 has recently received a full charge from an external power source, and, by the given moment, that charge has not been sufficiently depleted. On the other hand, SOC may be below the second predetermined level due to, for example, low ambient temperature or a fault within the energy-storage device 30 itself, as described above with respect to FIG. 1. Following the decision in frame 106, the method proceeds either to frame 108 or to frame 112.

If the energy-storage device 30 is between the first predetermined SOC and the second predetermined SOC, HEV 10 is retarded via the motor/generator 28 in frame 108. Following frame 108, the electrical energy from regenerative braking is directed to energy-storage device 30 in frame 110. If the energy-storage device is at or above the first predetermined SOC, or at or below the second SOC, HEV 10 is retarded via the motor/generator 28 in frame 112. Following frame 112, the electrical energy from regenerative braking is directed to the energy dissipating device, such as block heater 34, heating element 36 and catalyst pre-heaters 38, in frame 114. After either frame 110 or 114, the method returns to frame 102 where it is ready to control a subsequent regenerative braking event.

In the course of executing method 100, the controller 32 may regulate retardation of HEV 10 by blending frictional braking together with regenerative braking to vary the degree of HEV retardation, and redirect a portion of the energy that is recaptured by the motor/generator 28 to one or more energy dissipating devices (as described with respect to FIG. 1). The actual blend of frictional and regenerative braking may differ between frames 108 and 112, in order to preserve as much regenerative braking as practical under the circumstances. Regardless, however, whether only the regenerative braking or blended regenerative and frictional braking is used by method 100 to retard HEV 10, the resultant mode of operation provides higher efficiency than when solely frictional braking is employed.

While the best modes for carrying out the invention have been described in detail, those familiar with the art to which this invention relates will recognize various alternative designs and embodiments for practicing the invention within the scope of the appended claims.

The invention claimed is:

1. A method for controlling regenerative braking in a hybrid electric vehicle having an energy-storage device, a motor/generator configured to receive energy from and supply energy to the energy-storage device, and to retard the vehicle via the regenerative braking, and a controller arranged to control the regenerative braking, the method comprising:
   receiving a regenerative braking request;
   detecting whether the energy-storage device is between a first predetermined state of charge and a second predetermined state of charge, wherein the energy-storage device is configured to selectively store energy up to the first predetermined state of charge and release the stored energy down to the second predetermined state of charge;

retarding the vehicle via the motor/generator and directing electrical energy from the regenerative braking to an energy dissipating device configured to dissipate energy from the regenerative braking when the energy-storage device is at or above the first predetermined state of charge and also when the energy-storage device is at or below the second predetermined state of charge; and retarding the vehicle via the motor/generator and directing electrical energy from the regenerative braking to the energy-storage device when the energy-storage device is between the first predetermined state of charge and the second predetermined state of charge.

2. The method of claim 1, wherein the energy dissipating device is at least one of a heating element for the energy-storage device and a heating and ventilation and air conditioning (HVAC) system.

3. The method of claim 1, wherein the vehicle additionally includes a friction braking system configured to retard the vehicle, and wherein said retarding the vehicle via the motor/generator is accomplished in combination with the friction braking system to vary a degree of vehicle retardation.

4. The method of claim 3, wherein said retarding the vehicle via the motor/generator in combination with the friction braking system is regulated by the controller according to a predetermined schedule.

5. The method of claim 1, wherein the vehicle additionally includes an internal combustion engine configured to selectively propel the vehicle and capable of being shut-off, wherein the energy dissipating device is at least one of an engine-block heater and a catalyst pre-heater for an exhaust system of the internal combustion engine, and said directing electrical energy from the regenerative braking to at least one of the engine-block heater and the catalyst pre-heater is accomplished when the engine is shut-off.

6. The method of claim 1, wherein the vehicle additionally includes a fuel-cell configured to propel the vehicle and capable of being shut-off, wherein the energy dissipating device is a heater for the fuel-cell, and said directing electrical energy from the regenerative braking to the heater for the fuel-cell is accomplished when the fuel-cell is shut-off.

7. The method of claim 1, wherein the vehicle is a plug-in type having an electrical plug, such that the energy-storage device is capable of being recharged by connecting the plug to an external electrical power source.

8. A system for controlling regenerative braking in a hybrid electric vehicle having a motor/generator configured to retard the vehicle via the regenerative braking, the system comprising:

an energy-storage device configured to receive energy from and supply energy to the motor/generator and selectively store energy up to a first predetermined state of charge and release the stored energy down to a second predetermined state of charge;

an energy dissipating device configured to dissipate energy from the regenerative braking; and a controller configured to:
receive a regenerative braking request;
detect whether the energy-storage device is between the first predetermined state of charge and the second predetermined state of charge;
retard the vehicle via the motor/generator and direct electrical energy from the regenerative braking to an energy dissipating device configured to dissipate energy from the regenerative braking when the energy-storage device is at or above the first predetermined state of charge and also when the energy-storage device is at or below the second predetermined state of charge; and
retard the vehicle via the motor/generator and direct electrical energy from the regenerative braking to the energy-storage device when the energy-storage device is between the first predetermined state of charge and the second predetermined state of charge.

9. The system of claim 8, wherein the energy dissipating device is at least one of a heating element for the energy-storage device and a heating and ventilation and air conditioning (HVAC) system.

10. The system of claim 8, wherein the vehicle additionally includes a friction braking system configured to retard the vehicle, and wherein the controller is configured to retard the vehicle via the motor/generator in combination with the friction braking system to vary a degree of vehicle retardation.

11. The system of claim 10, wherein the controller is configured to retard the vehicle via the motor/generator in combination with the friction braking system according to a predetermined schedule.

12. The system of claim 8, wherein the vehicle additionally includes an internal combustion engine configured to selectively propel the vehicle and capable of being shut-off, wherein the energy dissipating device is at least one of an engine-block heater and a catalyst pre-heater for an exhaust system of the internal combustion engine, and the controller is configured to direct electrical energy from the regenerative braking to at least one of the engine-block heater and the catalyst pre-heater when the engine is shut-off.

13. The system of claim 8, wherein the vehicle additionally includes a fuel-cell configured to propel the vehicle and capable of being shut-off, wherein the energy dissipating device is a heater for the fuel-cell, and the controller is configured to direct electrical energy from the regenerative braking to the heater for the fuel-cell when the fuel-cell is shut-off.

14. The system of claim 8, wherein the vehicle is a plug-in type having an electrical plug, such that the energy-storage device is capable of being recharged by connecting the plug to an external electrical power source.

15. A hybrid electric vehicle employing a regenerative braking system, the regenerative braking system comprising:

an energy-storage device configured to selectively store energy up to a first predetermined state of charge and release the stored energy down to a second predetermined state of charge;

a motor/generator configured to receive energy from and supply energy to the energy-storage device, and to retard the vehicle via the regenerative braking;

an energy dissipating device configured to dissipate energy from the regenerative braking; and a controller configured to:
receive a regenerative braking request;
detect whether the energy-storage device is between the first predetermined state of charge and the second predetermined state of charge;
retard the vehicle via the motor/generator and direct electrical energy from the regenerative braking to an energy dissipating device configured to dissipate energy from the regenerative braking when the energy-storage device is at or above the first predetermined state of charge and also when the energy-storage device is at or below the second predetermined state of charge; and
retard the vehicle via the motor/generator and direct electrical energy from the regenerative braking to the energy-storage device when the energy-storage device is between the first predetermined state of charge and the second predetermined state of charge.

16. The vehicle of claim 15, wherein the energy dissipating device is at least one of a heating element for the energy-storage device and a heating and ventilation and air conditioning (HVAC) system.

17. The vehicle of claim 15, wherein the vehicle additionally includes a friction braking system configured to retard the vehicle, and wherein the controller is configured to retard the vehicle via the motor/generator in combination with the friction braking system according to a predetermined schedule to vary a degree of vehicle retardation.

18. The vehicle of claim 15, wherein the vehicle additionally includes an internal combustion engine configured to selectively propel the vehicle and capable of being shut-off, wherein the energy dissipating device is at least one of an engine-block heater and a catalyst pre-heater for an exhaust system of the internal combustion engine, and the controller is configured to direct electrical energy from the regenerative braking to at least one of the engine-block heater and the catalyst pre-heater when the engine is shut-off.

19. The vehicle of claim 15, wherein the vehicle additionally includes a fuel-cell configured to propel the vehicle and capable of being shut-off, wherein the energy dissipating device is a heater for the fuel-cell, and the controller is configured to direct electrical energy from the regenerative braking to the heater for the fuel-cell when the fuel-cell is shut-off.

20. The system of claim 15, wherein the vehicle is a plug-in type having an electrical plug, such that the energy-storage device is capable of being recharged by connecting the plug to an external electrical power source.

* * * * *